Patented Aug. 19, 1952

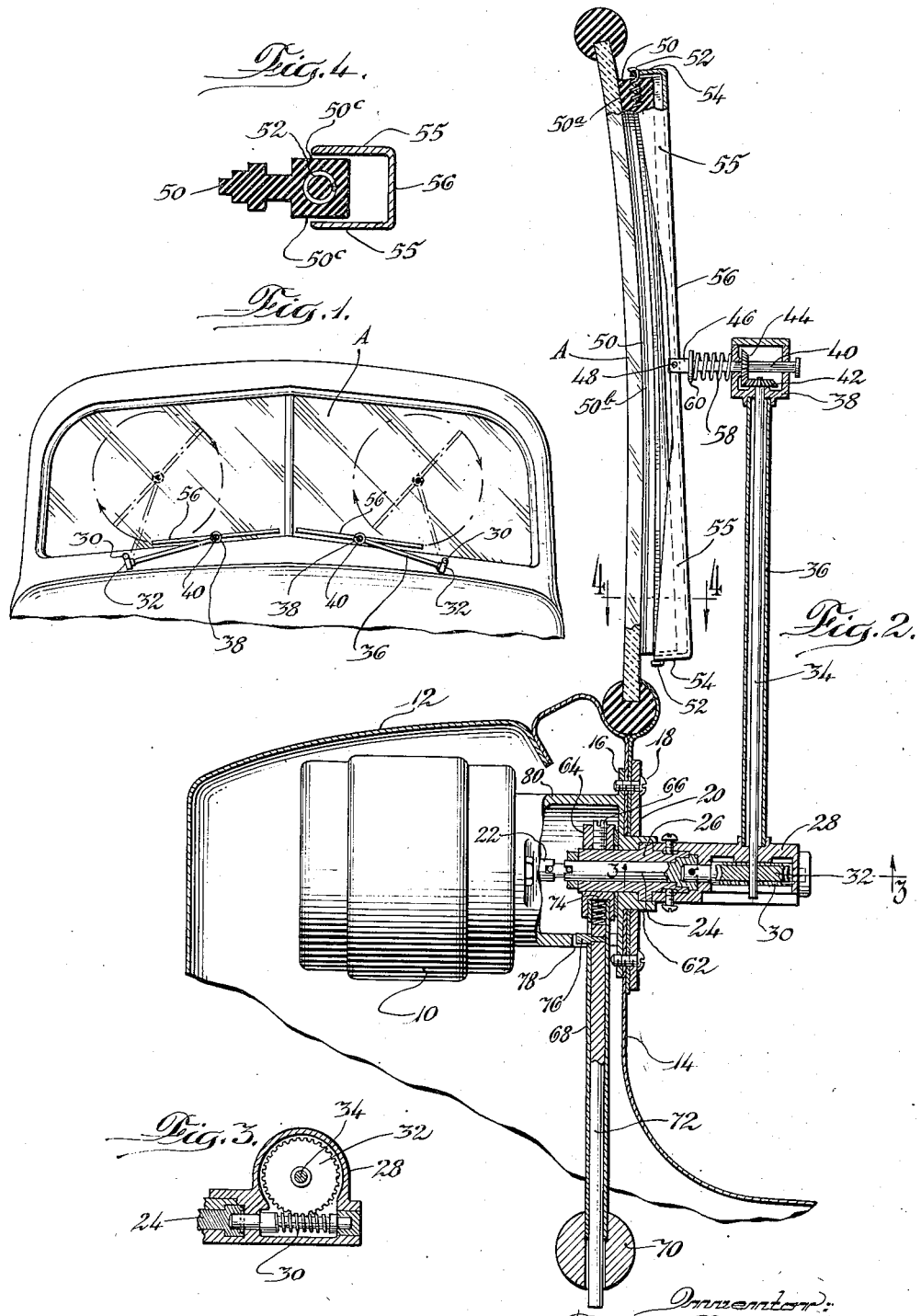

2,607,066

UNITED STATES PATENT OFFICE 2,607,066

WINDSHIELD WIPER

Robert B. Morton, Chicago, Ill., assignor to Stewart-Warner Corporation, Chicago, Ill., a corporation of Virginia Application November 23, 1945, Serial No. 630,169

9 Claims. (Cl. 15—254)

This invention relates to windshield wipers of the power driven type and one object of the invention is the provision of a new and improved windshield wiper which is equally adapted for use with flat or curved windshields.

Another object of the invention is to provide a new and improved windshield wiper having a wiping element flexibly supported so that its working edge which engages the windshield will readily conform to the contour thereof and is adapted to change its shape in accordance with differences of contour of the windshield at different positions at which the wiper blade engages it.

It is also an object of the invention to provide a new and improved windshield wiper having a flexible wiper blade which is readily conformable to the contour of the windshield and provided with means to prevent rolling of the wiper blade during its operation.

More specifically, it is an object of the invention to provide a windshield wiper having a flexible wiper blade adapted to conform to the contour of a windshield and provided with means for preventing rolling of the blade during operation, such as means including mechanism for spinning the blade about an axis transverse to its working edge and substantially at the middle of its length.

Other objects and advantages of the invention will appear from the following description taken in connection with the accompanying drawings, in which:

Fig. 1 is a front elevation on a small scale showing a vehicle windshield with a pair of windshield wipers embodying this invention associated therewith;

Fig. 2 is a side elevation of a windshield wiper mechanism, with parts shown in section to disclose certain features of the invention;

Fig. 3 is a detail section taken as indicated at line 3—3 on Fig. 2;

Fig. 4 is a transverse section of the wiper blade taken as indicated at line 4—4 on Fig. 2.

To adapt a windshield wiper for use on a windshield of irregular contour or of curved cross section, the rubber wiper blade may be attached to a supporting arm by its ends only, leaving the intermediate portion of the blade flexible and free to conform to the contour of the windshield. Usually, a body portion of the blade back of its working edge has, molded in it, a coil spring or other flexible metallic reinforcement which protrudes from the ends of the other member for actual attachment to the support. But when such a wiper or squeegee is slid across the glass of a windshield in a conventional manner, either with a reciprocating motion or with an oscillating movement, there is a tendency for the blade to roll instead of merely sliding because the frictional engagement of the blade with the windshield surface is at one side of the line or axis connecting the points of attachment of the flexible blade to the supporting means. The longer the blade the greater is the tendency for this rolling action and even though the end portions of the blade are checked against turning in the support, the flexible middle portion tends to drag in response to the friction and to twist and roll out of efficient contact with the windshield surface.

However, if such a blade is held against the glass and rotated or swung about a transverse axis at the middle of its length, the tendency to roll is no longer at the middle of the blade but at two points, half way from the middle to each end. The rolling tendency is reduced partly because these half sections are much shorter than the full length of the blade and partly because the tendency is for these two points to roll in opposite directions so that the resulting torque of one half the blade opposes the torque of the other half of the blade and the twisting effect is practically nullified. This permits a longer and faster moving blade with little or no rolling tendency and the drawings illustrate an arrangement embodying such a blade.

As shown in Fig. 2, a driving motor 10 is housed under the interior cowling or dash structure 12 of the vehicle and is supported from the dashboard 14 by a base flange 16 secured by bolts 18 which extend through a reinforcing plate 20 on the opposite face of the dashboard 14. The motor shaft 22 is coupled to a drive shaft 24 journalled in a bushing sleeve 26 which extends through the dashboard 14 and supports a gear casing 28 at its outer end. A driving worm 30 coupled to the shaft 24 is journalled in the casing 28 and meshes with a worm gear 32 secured to the lower end of a vertical shaft 34. A tubular support 36 extends upwardly from the casing 28 enclosing the shaft 34 and carrying at its upper end a housing 38 which includes bearing means for a short horizontal shaft 40 and also encloses a pair of bevel gears 42, 44 which transmit rotation from the shaft 34 to the shaft 40.

The rubber wiper blade or squeegee element 50 is shown as the type having a coiled wire reinforcement 52 molded in its body portion and the ends of this coil spring 52 are engaged respectively with lugs 54, 54 extending transversely from a supporting member 56. The middle portion of the blade 50 is unsupported except by the tension created by the attachment of its ends to the lugs 54, 54 and as shown, it is curved to conform with the curvature of the windshield shown at A. The shaft 40 terminates in a bifurcated yoke 46 connected by a pivot 48 to the wiper blade supporting bar 56 so that although the tubular member 36 and the housing 38 are carried in substantially rigid position spaced from the windshield, the part 56 and the wiper blade 50 carried thereby can tilt about the pivot 48 to approximate the inclination of the windshield A, while the flexibility of the member 50 permits it to conform accurately to the curved contour of the windshield surface. A coil spring 58 reacts between the housing 38 and the wiper blade 50 to hold the latter in working contact with the windshield surface; the yoke 46 provides a shoulder against which a washer 60 is lodged to receive the pressure of the spring 58 as clearly seen in Fig. 2. As best seen in that view, a splined connection is provided between the shaft 40 and gear 44 so that the shaft may be moved axially of the gear. An enlarged abutment on the outer end of the shaft is adapted to engage gear housing 38 for limiting axial movement of shaft 40 under the influence of spring 58.

Operation of the motor 10 drives the shaft 24 and worm 30 to rotate the worm gear 32, shaft 34, and bevel gear 42 which transmits rotation to the bevel gear 44 and its shaft 40 so that the resulting rotation of the yoke 46 turns the supporting arm 56 about the middle of its length and the arm carries with it the flexible wiping blade 50, thus spinning it against the surface of the windshield A and clearing a circular area thereof. As already explained, the tendency of the working edge portion 50a of the blade to turn or roll about the axis of the reinforcing spring 52 is practically eliminated by this spinning movement since a neutral point is created at 50b at about the middle of the length of the blade 50 and the outer end portions can be held against rotation by any suitable means at their connection with the lugs 54. For example, the lateral faces 50c of the body portion of the rubber blade 50 may be flat and parallel and may engage snugly between flange portions 55, 55 connecting the lugs 54 with the main body or backbone portion of the supporting member 56 forming channels in which the end portions of the flexible blade are held against rotation. In each half length of the element 50 the spinning of the element about its midpoint 50b will create some tendency for the working edge to roll over, but since the tendency in one-half of the blade 50 is in the opposite direction to the tendency set up in the other half, the rolling action in one end portion will resist the oppositely directed rolling action in the other end with the result that the working edge 50a will remain in efficient contact with the surface of the windshield throughout the length of the blade.

When a windshield wiper of this type is not in service it is desirable to move it entirely out of the field of vision so as to leave the windshield wholly unobstructed, and to permit this, the casing 28 and bushing 26 are mounted for rotative adjustment about the axis of the bushing. The bushing 26 is turnably mounted in a bearing boss 62 which projects through the dashboard 14 and is integral with the base flange 16 of the motor 10. Inside the dashboard 14 the bushing 26 carries a hub 64 secured to the bushing by a set screw 66 and supporting a tubular handle 68 shown with a spherical hand grip 70 at its lower end. A push rod 72 is slidable in the handle in opposition to a spring 74 pocketed in the hub 64 and said push rod carries a detent pin 76 which normally engages in a notch 78 in the cylindrical housing 80 which extends integrally from the base flange 16 and serves as a mounting bracket for the motor 10. Normally, the handle 68 and the hub 64 are thus held against rotation but upon depressing the outer end of the push rod 72 which projects from the hand grip 70, the detent pin 76 may be disengaged from the notch 78 so that by swinging the handle 72 through a suitable angle the supporting tube 36 will be swung through a similar angle from its upstanding position to the position at which it is shown in Fig. 1, lowering the wiper blade and its supporting member 56 into a parking position in alignment with the lower edge of the windshield A and thus moving the working parts out of the field of vision.

While there is shown and described herein certain structure illustrating the invention, it is to be understood that the invention is not limited thereto or thereby but may assume numerous other forms and includes all modifications, variations and equivalents coming within the scope of the following claims.

I claim:

1. In combination with a vehicle body having a windshield, a windshield wiper including a flexible wiping element, a support extending longitudinally thereof, means connecting the ends of said wiping element to the respectively adjacent ends of said support, a shaft extending transversely of said support and attached thereto at substantially the middle of said support, bearing means for said shaft, a bracket secured to said vehicle body adjacent one edge of the windshield, a sleeve extending through said bracket with one end inside the vehicle body and the other end outside the same, a casing secured to the outer end of said sleeve, a tubular arm extending from said casing to the bearing means for said shaft, a connecting shaft geared to said first-mentioned shaft and extending through said tubular arm, a motor supported on said bracket inside the vehicle body, and driving means extending through said sleeve from the motor into operative engagement with said connecting shaft for rotating the wiping element.

2. In the combination defined in claim 1, said sleeve being turnably mounted in said bracket, a handle attached to the inner end of said sleeve for turning it to swing the wiping element from operative position to a parking position adjacent one edge of the windshield, and detent means carried by the handle engageable with a portion of the bracket at the position of the handle corresponding to operative position of the wiping element.

3. In an actuating mechanism for an automotive vehicle windshield wiper having a support for a wiping element secured upon a rotatable axis intermediate the ends of the support, the combination comprising a bracket secured to the vehicle body adjacent one edge of the vehicle windshield, a sleeve rotatably secured upon a fixed axis in said bracket, a hollow arm secured to said sleeve outside said vehicle and supporting said wiping element adjacent the outer face of the windshield, power means in the vehicle for operating said wiper, interengaging drive connections for driving said wiper from said power means including a shaft housed in said sleeve and rotated by said power means, a second shaft extending through said hollow arm, and gearing housed in said sleeve and driven by the power driven shaft for establishing a driving connection between said shafts, the shaft in said hollow arm being connected to rotate said wiping element upon said rotatable axis when said power means is operative, and a handle attached to the end of said sleeve in said vehicle for rotating the same upon said fixed axis to swing the arm and wiping element from operative position to a parking position adjacent one edge of the windshield.

4. In an actuating mechanism for an automotive vehicle windshield wiper having a support for a wiping element secured upon a rotatable axis intermediate the ends of the support, the combination comprising a bracket secured to the vehicle body adjacent one edge of the vehicle windshield, a sleeve rotatably secured upon a fixed axis in said bracket, an arm secured to one end of said sleeve and extending generally radially therefrom to support said wiping element adjacent the outer face of the windshield, drive connections extending through said sleeve and arm for rotating the wiping element, a handle attached to the other end of said sleeve for rotating the same upon the fixed axis to swing the arm and wiping element from operative position to a parking position adjacent one edge of the windshield or vice versa, and detent means carried by the handle and engageable with a portion of the bracket releasably to secure said arm in raised position with the wiping element adjacent the outer face of the windshield.

5. A windshield cleaner comprising an elongated wiping element having a blade portion and a blade holder member extending longitudinally of said blade portion, a shaft connected to said blade holder adjacent its longitudinal midpoint and extending outwardly therefrom in a direction away from said blade portion, bearing structure adapted to be disposed on one side of said windshield and to support said shaft for rotary and axial movement relative to a fixed axis, a compression spring surrounding said shaft and biasing the same in a direction to urge said blade portion of the wiping element into engagement with the windshield, means forming an abutment adjacent the end of said shaft opposite that to which said wiping element is secured adapted to engage said bearing means for fixing the ultimate limit to which said shaft is movable axially under the influence of said spring, and means for rotating said shaft.

6. A windshield cleaner comprising an elongated wiping element having a blade portion and a blade holder member extending longitudinally of said blade portion, a shaft connected to said blade holder adjacent its longitudinal midpoint and extending outwardly therefrom in a direction away from said blade portion, bearing structure adapted to be disposed on one side of said windshield and to support said shaft for rotary and axial movement relative to a fixed axis, a compression spring surrounding said shaft and biasing the same in a direction to urge said blade portion of the wiping element into engagement with the windshield, means forming an abutment adjacent the end of said shaft opposite that to which said wiping element is secured adapted to engage said bearing means for fixing the ultimate limit to which said shaft is movable axially under the influence of said spring, a gear splined to said shaft relative to which said shaft is axially movable, and means to rotate said gear for rotating the shaft and wiper.

7. A cleaner for the windshield of an automotive vehicle or the like comprising an elongated wiping element having a blade portion and a blade holder member extending longitudinally of said blade portion, a shaft connected to said blade holder adjacent its longitudinal midpoint and extending outwardly therefrom in a direction away from said blade portion, bearing structure supporting said shaft for rotary and axial movement, a hollow sleeve journaled in the body of the vehicle and extending from the inside to the outside thereof, a hollow arm fixed at one end to said sleeve on the outside of said vehicle and supporting said bearing structure adjacent the other end at a fixed distance in front of said windshield, said sleeve being rockable upon its own axis to move said bearing structure and wiping element between operative and parked positions, a compression spring biasing said blade holder and shaft in a direction to urge said blade portion of the wiping element into engagement with the windshield, means forming an abutment adjacent the end of said shaft opposite that to which said wiping element is secured adapted to engage said bearing structure for fixing the ultimate limit to which said shaft is movable axially under the influence of said spring, a source of power in said vehicle, and drive connections extending from said source of power through the sleeve and arm for spinning said shaft and the wiping element.

8. A wiper for effectively and uniformly cleaning a convexly curved vehicle windshield, comprising an elongated supporting member having laterally projecting lugs adjacent its opposite ends, a flexible wiping element having its ends attached to the lugs to stretch the element between the lugs, the element being spaced laterally from the supporting member, guiding elements on the supporting member to restrain the ends of the wiping element from twisting, a shaft attached to the supporting member approximately at its longitudinal center, a bearing supporting the shaft for rotation, an arm supporting the bearing opposite the windshield, a spring biasing the supporting member toward the windshield to urge the wiping element along its entire length into conformative wiping contact with the windshield, rotary motive means, and a driving connection between the motive means and the shaft to rotate the wiping element on the windshield.

9. A wiper for effectively and uniformly cleaning a convexly curved vehicle windshield, comprising an elongated supporting member having laterally projecting lugs adjacent its opposite ends, a flexible wiping element having its ends attached to the lugs to stretch the element between the lugs, the element being spaced laterally from the supporting member, guiding elements on the supporting member to restrain the ends of the wiping element from twisting, a first shaft attached to the supporting member approximately at its longitudinal center, a bearing supporting the shaft for rotation, a second bearing adapted to be mounted adjacent one edge of the windshield, a sleeve journaled in the bearing, an arm mounted on the sleeve and supporting the first bearing opposite the windshield, a spring biasing the supporting member toward the windshield to urge the wiping element along its entire length into conformative wiping contact with the windshield, rotary motive means including a second shaft journaled in the sleeve, a driving connection between the two shafts to rotate the wiping element on the windshield, and means to rotate the sleeve for moving the arm toward a parked position adjacent one edge of the windshield.

ROBERT B. MORTON.

REFERENCES CITED

The following references are of record in the file of this patent:

UNITED STATES PATENTS

| Number | Name | Date |
|---|---|---|
| 1,610,361 | Calvin | Dec. 14, 1926 |
| 1,711,756 | Stevens | May 7, 1929 |
| 2,130,957 | Kingsley | Sept. 20, 1938 |
| 2,167,207 | Horton | July 25, 1939 |
| 2,181,066 | Rau | Nov. 21, 1939 |
| 2,239,754 | Marti | Apr. 29, 1941 |
| 2,254,343 | Zierer | Sept. 2, 1941 |
| 2,279,983 | Goode | Apr. 14, 1942 |

FOREIGN PATENTS

| Number | Country | Date |
|---|---|---|
| 328,327 | Great Britain | Apr. 28, 1930 |
| 433,467 | Great Britain | Aug. 15, 1935 |